United States Patent
Yoshihara et al.

(10) Patent No.: US 6,818,322 B2
(45) Date of Patent: Nov. 16, 2004

(54) SURFACE TREATED STEEL SHEET WITH LESS ENVIRONMENTAL IMPACT FOR ELECTRONIC COMPONENTS, EXCELLENT IN SOLDER WETTABILITY, A RUST-PROOF PROPERTY AND A WHISKER-PROOF PROPERTY

(75) Inventors: Ryoichi Yoshihara, Himeji (JP); Tokitsugu Shirakawa, Himeji (JP); Yasuhiko Miura, Himeji (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/468,726

(22) PCT Filed: Feb. 22, 2002

(86) PCT No.: PCT/JP02/01630
§ 371 (c)(1),
(2), (4) Date: Aug. 21, 2003

(87) PCT Pub. No.: WO02/066705
PCT Pub. Date: Aug. 29, 2002

(65) Prior Publication Data
US 2004/0072012 A1 Apr. 15, 2004

(30) Foreign Application Priority Data
Feb. 22, 2001 (JP) ........................................ 2001-046152

(51) Int. Cl.[7] .......................... C23C 28/00; C23C 30/00; B32B 15/04; B32B 15/18
(52) U.S. Cl. ....................... 428/646; 428/648; 428/658; 428/679; 428/684
(58) Field of Search ................................ 428/646, 648, 428/658, 679, 684

(56) References Cited
U.S. PATENT DOCUMENTS 4,508,601 A  *  4/1985  Nemoto et al. ............... 205/85
4,749,626 A     6/1988  Kadija et al.
4,999,258 A  *  3/1991  Wake et al. .................. 428/632
5,312,026 A  *  5/1994  Yamanashi ................... 228/144
5,365,652 A  * 11/1994  Papa, Jr. ....................... 29/605
5,429,882 A  *  7/1995  Carey et al. .................. 428/647
5,482,090 A  *  1/1996  Yamanashi ................... 138/171
5,585,177 A  * 12/1996  Okamura et al. ........... 428/341

(List continued on next page.)

FOREIGN PATENT DOCUMENTS

| JP | 49-129      | 1/1974  |
| JP | 53-115623 A | 10/1978 |
| JP | 54-035136   | 3/1979  |
| JP | 57-67187 A  | 4/1982  |
| JP | 59-143089 A | 8/1984  |
| JP | 62-74099 A  | 4/1987  |
| JP | 62-77481 A  | 4/1987  |
| JP | 02-270970 A | 11/1990 |
| JP | 03-183796 A | 8/1991  |

*Primary Examiner*—John J. Zimmerman
*Assistant Examiner*—Jason L Savage
(74) *Attorney, Agent, or Firm*—Kenyon & Kenyon (57) ABSTRACT

The present invention provides a surface treated steel sheet for electronic components which does not include lead, which is a hazardous substance with environmental impact, and, in particular, satisfies the solder wettability after retort treatment, a rust-proof property and a whisker-proof property simultaneously. More specifically, the present invention is a surface treated steel sheet with less environmental impact for electronic components excellent in solder wettability, a rust-proof property and a whisker-proof property and having an Sn—Zn alloy layer which is formed by plating Sn and Zn on a steel sheet or a Ni plated steel sheet and then applying thermal diffusion treatment, or by plating Sn—Zn alloy on a steel sheet or a Ni plated steel sheet, characterized in that the amount of said Sn—Zn alloy layer is not less than 3 g/m$^2$, the Zn/Sn ratio (in weight ratio) is 0.01 to 10, more preferably 0.01 to 0.1, and an inorganic film mainly composed of magnesium phosphate is formed in the amount of 1 to 100 mg/m$^2$ in terms of the amount of P+Mg on said Sn—Zn alloy layer.

2 Claims, 2 Drawing Sheets

U.S. PATENT DOCUMENTS

| | | | | |
|---|---|---|---|---|
| 5,650,238 A | * | 7/1997 | Urakawa et al. | 428/648 |
| 5,827,618 A | * | 10/1998 | Oyagi et al. | 428/621 |
| 6,248,455 B1 | * | 6/2001 | Adams et al. | 428/626 |
| 6,248,456 B1 | * | 6/2001 | Yamane et al. | 428/626 |
| 6,309,477 B1 | * | 10/2001 | Shimakura et al. | 148/253 |
| 6,572,983 B2 | * | 6/2003 | Shimakura et al. | 428/681 |

* cited by examiner

SURFACE TREATED STEEL SHEET WITH LESS ENVIRONMENTAL IMPACT FOR ELECTRONIC COMPONENTS, EXCELLENT IN SOLDER WETTABILITY, A RUST-PROOF PROPERTY AND A WHISKER-PROOF PROPERTY

TECHNICAL FIELD

The present invention relates to a surface treated steel sheet for electronic components, used for electronic components of electric products, excellent in solderability, a rust-proof property and a whisker-proof property, and not containing substances with environmental impact such as lead, etc.

BACKGROUND ART

For electronic components of electric products, a tinplate, a terneplate, a solder plated steel sheet or the like, as a surface treated steel sheet particularly excellent in solderability, is generally used.

As an example, a surface treated steel sheet having an Sn plated layer of 8.4 to 11.2 $g/m^2$ on each surface of a steel sheet (hereunder referred to as "#75 to #100 tinplate") has been used as a surface treated steel sheet having such excellent solder wettability as to be soldered by dipping the steel sheet in a molten solder bath for a short period of time. However, a space between electronic components has narrowed due to the recent downsizing of electric products, and as a result, tinplate has produced the problems of direct short circuits, the destruction of an insulating layer, and the like, caused by acicular single crystals (whiskers) grown from a tin plated layer. For that reason, a terneplate or a solder plated steel sheet which does not generate whiskers has mainly been used.

As methods for preventing the generation of whiskers, advocated have so far been the method of applying alloy plating (Japanese Examined Patent Publication No. S58-2598, Japanese Unexamined Patent Publication No. S49-129, etc.) and the method of applying post-treatment after plating (Japanese Examined Patent Publication Nos. S56-47955 and S56-47956, Japanese Unexamined Patent Publication Nos. S59-143089 and S62-77481, etc.). However, those methods have scarcely been put to practical use because the alloy plating or the post-treatment hinders the solderability. In the meantime, there is a method which is put to practical use by the optimization of an alloy composition and a chromate treated layer as disclosed in Japanese Unexamined Patent Publication Nos. H2-270970 and H3-183796.

In recent years, the regulations against hazardous substances with environmental impact have been enforced in view of global environmental problems and, in particular, hexavalent chromium and lead are objects of regulation. Therefore, in addition to the need for a material with which lead-tin solder is substituted, the need for a material as a plated steel sheet with which a terneplate or a solder plated steel sheet is substituted is getting increased. In the case of small-sized electronic components in particular, they are soldered by dipping in a molten solder bath for a short period of time so that they are soldered with high efficiency.

Further, as the electronic components are sometimes stored for a long period of time, the performance of the electronic components after long storage is evaluated in the accelerated manner by applying an accelerating treatment in a retort or the like for experimentally reproducing the long storage conditions, and a flux is also being substituted with a type of material having a low activity and not containing chlorine. For a surface treated steel sheet for electronic components, remarkably excellent solder wettability including solder wettability after the accelerating treatment is required.

As described above, there is a strong demand to provide a surface treated steel sheet with less environmental impact for electronic components excellent in both solder wettability and a whisker-proof property.

The object of the present invention is to provide a surface treated steel sheet for electronic components which does not include lead, which is a hazardous substance with environmental impact, and, in particular, satisfies the solder wettability after retort treatment, a rust-proof property and a whisker-proof property, simultaneously.

DISCLOSURE OF THE INVENTION

The present invention is a surface treated steel sheet capable of securing good a whisker-proof property and a good rust-proof property which have been problems in tinplate, while securing more excellent solder wettability, after retort treatment, than a terneplate used for application to electronic components which are currently soldered by dipping in a molten solder bath for a short period of time.

Such a surface treated steel sheet can be attained by; in a surface treated steel sheet for electronic components having an Sn—Zn alloy layer which is formed by plating Sn and Zn on a steel sheet or a Ni plated steel sheet and then applying thermal diffusion treatment, or by plating Sn—Zn alloy on a steel sheet or a Ni plated steel sheet: specifying the amount of Sn—Zn alloy and a Zn/Sn ratio; and applying thereon an inorganic film mainly composed of magnesium phosphate as the substitution of a conventional chromate film.

That is, the present invention is a surface treated steel sheet with less environmental impact for electronic components: excellent in solder wettability, a rust-proof property and a whisker-proof property; and having an Sn—Zn alloy layer which is formed by plating Sn and Zn on a steel sheet or a Ni plated steel sheet and then applying thermal diffusion treatment, or by plating Sn—Zn alloy, characterized in that: the amount of said Sn—Zn alloy layer is not less than 3 $g/m^2$; the Zn/Sn ratio (in weight ratio) is 0.01 to 10, more preferably 0.01 to 0.1; and an inorganic film mainly composed of magnesium phosphate is formed in the amount of 1 to 100 $mg/m^2$ in terms of the amount of P+Mg on said Sn—Zn alloy layer.

BEST MODE FOR CARRYING OUT THE INVENTION

The present invention will hereunder be explained in detail. Firstly, the reasons for limiting the scope of a surface treated steel sheet according to the present invention will be explained.

Figure 1:
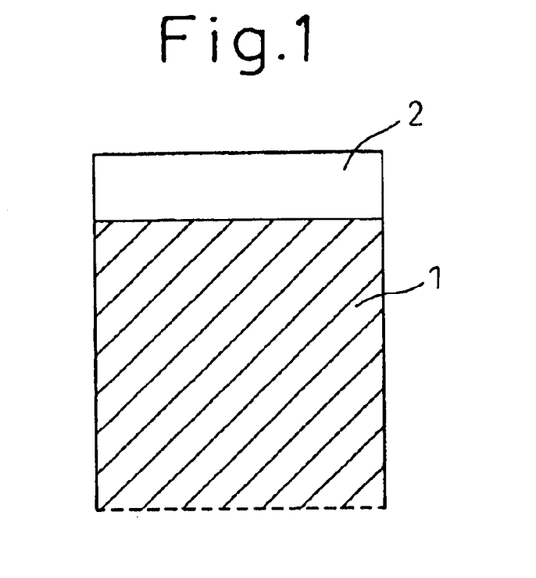
FIG. 1 is a schematic drawing showing the surface layer structure in the cross section of the plated layer of a surface treated steel sheet according to the present invention.

FIG. 1 schematically shows the surface layer structure in the cross section of the plated layer of a surface treated steel sheet according to the present invention. In the figure: numeral 1 designates an Sn—Zn alloy layer which is formed by plating Sn and Zn on a steel sheet or a Ni plated steel sheet (not shown in the figure) and then applying thermal diffusion treatment, or by plating Sn—Zn alloy on a steel sheet or a Ni plated steel sheet; and numeral 2 an inorganic film mainly composed of magnesium phosphate and formed on an Sn—Zn alloy layer 1, which is most intrinsic to the present invention.

An Sn—Zn alloy layer is a plated film which constitutes the basis of the present invention, and the deposited amount is required to be at least 3.0 g/m$^2$ or more for securing good solder wettability and a good rust-proof property. The upper limit thereof is not particularly determined in the present invention, but it is preferable that the upper limit is about 50 g/m$^2$ from the viewpoint of the cost.

With regard to methods for forming an Sn—Zn alloy layer, in addition to the method of forming the alloy layer by electroplating Sn and Zn on a steel sheet or a Ni plated steel sheet and then applying thermal diffusion treatment to the steel sheet or the Ni plated steel sheet, there are a method of directly coating a steel sheet with Sn—Zn alloy using electroplating and a method of dipping a steel sheet in a molten Sn—Zn alloy bath, namely the hot dipping method. Further, by using an Ni plated substrate steel sheet instead of said steel sheet in the above three methods as disclosed in Japanese Unexamined Patent Publication Nos. H2-270970 and H3-183796, it is possible to form an Ni plated layer or an Fe—Ni diffusion layer at each interface on a steel sheet and an Sn—Zn alloy layer on the surface layer. Note that in the present invention an Sn—Zn alloy layer is formed on both surfaces of a steel sheet or a Ni plated steel sheet. Accordingly, the present invention does not particularly restrict a method for forming an Sn—Zn alloy layer.

By forming an Ni plated substrate layer, when an Sn—Zn alloy layer is thin, the Sn—Zn alloy layer is uniformed and the rust-proof property improves.

Next, the restrictions related to the Zn/Sn ratio (in weight ratio) of an Sn—Zn alloy layer and an antioxidation film will be explained. By forming a thin inorganic film, which is mainly composed of magnesium phosphate in the amount of 1 to 100 mg/m$^2$ in terms of the amount of P+Mg, on an Sn—Zn alloy layer having a deposited amount of not less than 3 g/m$^2$ and a Zn/Sn ratio (in weight ratio) of not more than 10.0 by dipping in a bath mainly composed of magnesium biphosphate solution and then drying, it becomes possible to suppress the growth of the oxide film after accelerating treatment such as retort treatment and to secure excellent solder wettability and a rust-proof property of the same level as that of a conventional chromate film, as seen in FIG. 2.

Figure 3:
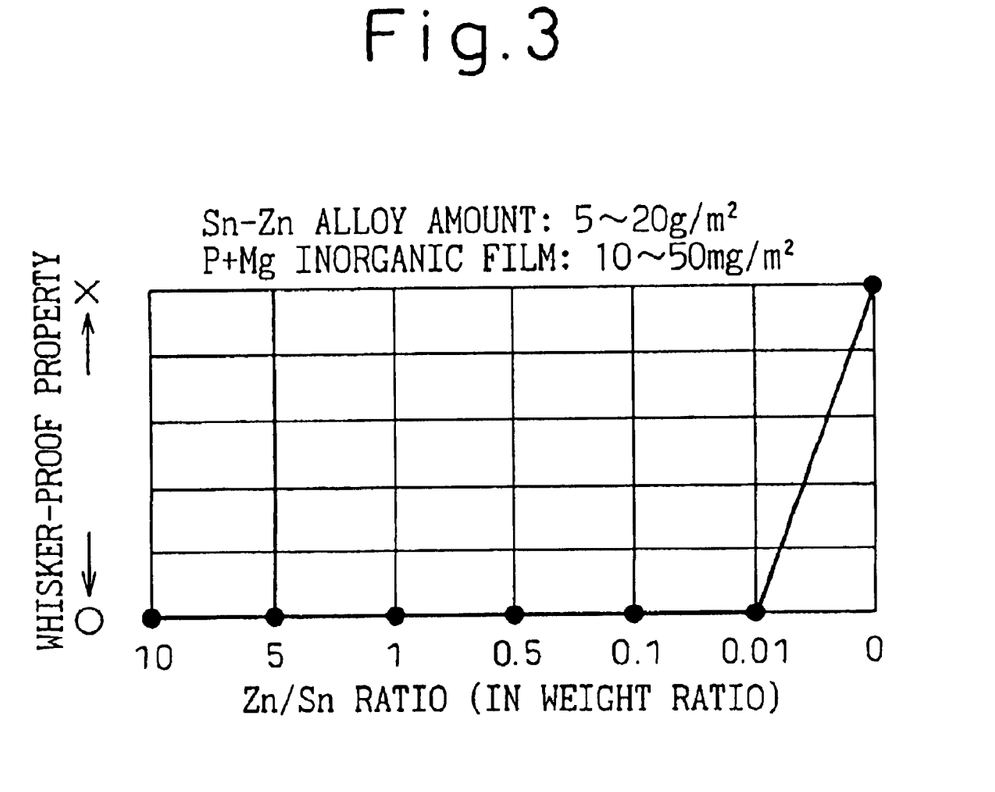
FIG. 3 is a graph showing the relation between the Zn/Sn ratio of an Sn—Zn alloy layer and a whisker-proof property.

Further, by setting the lower limit of a Zn/Sn ratio (in weight ratio) at not less than 0.01, it becomes possible to secure a good whisker-proof property as shown in FIG. 3.

Figure 2:
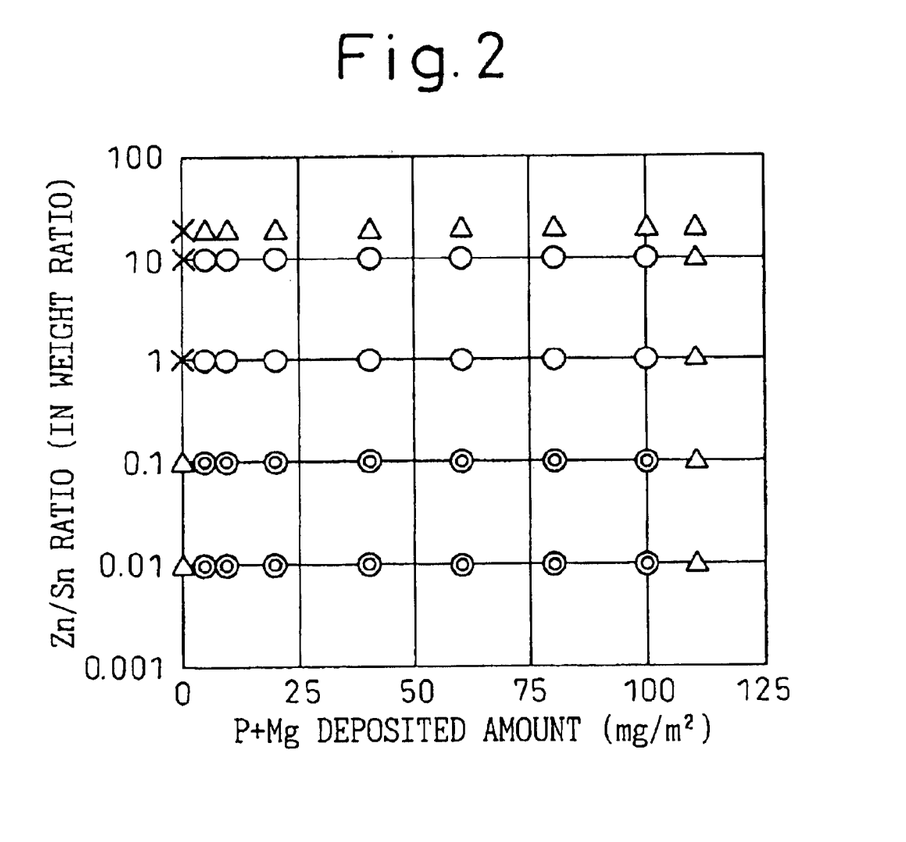
FIG. 2 is a map showing the relation among the P+Mg deposited amount of an inorganic film, the Zn/Sn ratio of an Sn—Zn alloy layer and solder wettability.

FIG. 2 shows the relationships between the deposited amount of P+Mg which represents the amount of an inorganic film mainly composed of magnesium phosphate and formed on a surface layer, the Zn/Sn ratio (in weight ratio) of an Sn—Zn alloy layer, and solder wettability, when an Sn—Zn alloy amount is 5.0 to 20.0 g/m$^2$. In this case, the solder wettability was evaluated by using a device to record the deterioration of a solder meniscus with age, employing Sn—Ag lead-free solder as the solder and two kinds of flux, inactive type and active type, as the flux, and measuring the wettability after test pieces were subjected to the accelerating treatment in a retort at 105° C. for 8 hours.

The results of the evaluation are expressed by the mark ⊙ when the wet time (zero cross time) is within 3 seconds under the inactive flux, ○ when the same is within 3 seconds under the active flux, Δ when the same is 3 to 5 seconds under the active flux and X when the same is not less than 5 seconds under the active flux.

As is shown in FIG. 2, the range of the Zn/Sn ratio where the solder wettability is good is not more than 10.0 and, in particular, very good wettability is obtained in the range not more than 0.1 even under the inactive flux. With regard to the P+Mg deposited amount, in the case that the deposited amount is zero, the evaluation result is Δ when the Zn—Sn ratio (in weight ratio) is in the range of 0.01 to 0.1 and X when the same is not less than 1, and therefore, in order for the inorganic film to function as an antioxidation film, the P+Mg deposited amount must be not less than 1 mg/m$^2$. With regard to the upper limit of the P+Mg deposited amount, though it varies depending on the type of a coating method, there is a tendency to hinder the solder wettability when the deposited amount exceeds 100 mg/m$^2$. Therefore, it is preferable that the P+Mg deposited amount is not more than 100 mg/m$^2$.

FIG. 3 shows the result on the relation between the Zn/Sn ratio (in weight ratio) of an Sn—Zn alloy layer and the whisker-proof property. The test for evaluating the whisker-proof property was carried out by subjecting the test pieces to 90 degree bending and bulging processing, and then aging for 3 months in the atmosphere of 60° C. in temperature and 90% in relative humidity which was similar to the atmosphere employed in the moisture resistance test. The evaluation itself was carried out by visual inspection and scanning electron microscope, and the results of the evaluation are expressed by the mark ○ when the occurrence of whiskers is less than 50 μm and X when the same is not less than 50 μm.

As is shown in FIG. 3, with regard to the whisker-proof property, the occurrence of whiskers is less than 50 μm when the Zn/Sn ratio (in weight ratio) is not less than 0.01. From the above explanation, the range of the Zn/Sn ratio (in weight ratio) is limited to not less than 0.01 from the viewpoint of the whisker-proof property, not more than 10.0 from the viewpoint of the solder wettability under the active flux, and not more than 0.1 from the viewpoint of the solder wettability under the inactive flux.

EXAMPLE

The present invention will further be explained based on the examples hereunder. The evaluation results of the performances in the examples wherein detailed conditions are varied and the comparative examples are summarized in Table 1.

Example 1

Low carbon cold rolled steel sheets produced by cold rolling and annealing in a usual manner were subjected to degreasing and pickling, by a usual method, and then coated, in order, with Ni plating under the treatment conditions shown in the item (1), Sn plating under the treatment conditions shown in the item (2) and Zn plating under the treatment conditions shown in the item (3). In succession, the steel sheets were subjected to a heat treatment at a steel sheet surface temperature of 250 to 350° C. for not less than 0.5 second in the atmosphere using an electric resistance heating method, and the plated films mainly composed of Sn—Zn binary alloy were formed thereon. Further, the steel sheets were subjected to post-treatment under the conditions shown in the items (4) and (5) and, after that, to various kinds of evaluation tests.

| (1) Ni plating | | | |
|---|---|---|---|
| ① Bath condition | $NiSO_4 \cdot 7H_2O$: | | 200–300 g/L (liter) |
| | $H_2SO_4$: | | 0–50 g/L (liter) |
| | $H_3BO_3$: | | 40 g/L (liter) |
| ② Plating condition | Bath temperature: | | 40–50° C. |
| | Current density: | | 5–30 A/dm² |
| (2) Sn plating | | | |
| ① Bath condition | Tin sulfate: | | 20–30 g/L (liter) |
| | Phenolsulfonic acid: | | 20–30 g/L (liter) |
| | Ethoxylation α-naphtholsulfonic acid: | | 2–3 g/L (liter) |
| ② Plating condition | Bath temperature: | | 35–45° C. |
| | Current density: | | 2–30 A/dm² |
| (3) Zn plating | | | |
| ① Bath condition | $ZnSO_4 \cdot 7H_2O$: | | 200–400 g/L (liter) |
| | $Na_2SO_4$: | | 50–150 g/L (liter) |
| ② Plating condition | Bath temperature: | | 40–50° C. |
| | Current density: | | 5–30 A/dm2 |
| (4) Treatment for removing surface layer oxide film | | | |
| | Dipping time: 3 seconds | | |
| ① Bath condition | $H_2SO_4$: | | 10–20 g/L (liter) |
| ② Bath temperature | Ordinary temperature (20–30° C.) | | |
| (5) Antioxidation film treatment | | | |
| ① Bath condition | magnesium biphosphate solution: | | 1–20 g/L (liter) |
| ② Treatment condition | Bath: Ordinary temperature to 50° C. (dip for 3–5 seconds) | | |

Example 2

Low carbon cold rolled steel sheets produced by cold rolling and annealing, in a usual manner, were subjected to degreasing and pickling by a usual method, and then, in order, coated with Ni plating under the treatment conditions shown in the item (1) of Example 1, and Sn—Zn alloy plating under the treatment conditions shown in the item (6) below and subjected to the treatment for removing surface layer oxide films under the treatment conditions shown in the item (4) of Example 1. In succession, the steel sheets were subjected to an antioxidation film treatment under the conditions shown in the item (5) of Example 1 and, after that, to various kinds of evaluation tests.

| (6) Sn—Zn alloy hot dip plating | | |
|---|---|---|
| ① Bath condition | Sn—Zn alloy | |
| ② Plating conditions | Bath temperature: | 250–300° C. |
| | Dipping time: | 1 second |
| | Plating amount: | 30–40 g/m² (wiping control) |

Example 3

Low carbon cold rolled steel sheets produced by cold rolling and annealing in a usual manner were subjected to degreasing and pickling by a usual method, and then, in order, coated with Ni plating under the treatment conditions shown in the item (1) of Example 1, and Sn—Zn alloy plating under the treatment conditions shown in the item (7) below and subjected to the treatment for removing surface layer oxide films under the treatment conditions shown in the item (4) of Example 1. In succession, the steel sheets were subjected to an antioxidation film treatment under the conditions shown in the item (5) of Example 1 and, after that, to various kinds of evaluation tests.

| (7) Sn—Zn alloy electroplating | | |
|---|---|---|
| ① Bath conditions | Alkanolsulfonic acid: | 10–200 g/L (liter) |
| | Bivalent zinc: | 1–50 g/L (liter) |
| | Bivalent Tin: | 100–500 g/L (liter) |
| ② Plating conditions | Bath temperature: | 50–60° C. |
| | Current density: | 10–200 A/dm² |

Comparative Example 1—1

Comparative Example 1—1 was prepared by applying a chromate treatment under the conditions shown in the item (8) below instead of the treatments shown in the items (4) and (5) of Example 1, with the other conditions being the same as Example 1.

| (8) Chromate treatment | | |
|---|---|---|
| ① Bath condition | $CrO_3$: | 50–100 g/L (liter) |
| ② Bath temperature: | | 40–50° C. (dip for 5 seconds) |

Comparative Example 1–2

Comparative Example 1–2 was prepared by eliminating the chromate treatment shown in the item (8) from Comparative Example 1—1, with the other conditions being the same as Example 1.

Comparative Example 2

Comparative Example 2 is an electroplated tinplate having the Sn plating amount of 11.2 g/m² per each surface (referred to as "#100 tinplate"), and the plate is subjected to various kinds of evaluation tests.

Comparative Example 3

Comparative Example 3 is a lead plated steel sheet (referred to as "terneplate") having the Pb plating amount of 30 g/m² per each surface, and the plate is subjected to various kinds of evaluation tests.

The above-mentioned Examples according to the present invention and Comparative Examples were subjected to the evaluation tests shown in the items (a) to (c) below and their properties were evaluated. It should be noted that, with regard to Examples, Sn—Zn alloy plating amount (g/m²), Zn/Sn ratio (in weight ratio) and the P+Mg deposited amount were measured by the methods shown in the items (1) to (3) below before they were subjected to the evaluation.

(a) Solder Wettability Test

The solder wettability test was carried out by using a device to record the deterioration of a solder meniscus with age (SWET-2100, manufactured by Tarutin Kester, Co., Ltd.), employing Sn—Ag—Bi lead-free solder (SA2515, manufactured by Tarutin Kester, Co., Ltd.) as the solder and two kinds of flux, non-chloride flux (NA200, manufactured by Tamura Giken Co., Ltd.) and active flux containing chlorine (NS828, manufactured by Nihon Superior Co., Ltd.) as the flux, and wettability was measured after the test pieces were subjected to the accelerating treatment in a retort at 105° C. for 8 hours.

The results of the evaluation are expressed by the mark ⊙ when the wet time (zero cross time) is within 3 seconds under the inactive flux, ○ when the same is within 3 seconds under the active flux, Δ when the same is 3 to 5 seconds under the active flux and X when the same is not less than 5 seconds under the active flux.

(b) Whisker-Proof Test

The whisker-proof test was carried out by subjecting the test pieces to 90 degree bending and bulging processing, and then aging for 3 months in the atmosphere of 60° C. in temperature and 90% in relative humidity which was similar to the atmosphere employed in the moisture resistance test. The evaluation itself was carried out by visual inspection and by a scanning electron microscope, and the results of the evaluation are expressed by the mark ○ when the occurrence of whiskers is less than 50 μm and X when the same is not less than 50 μm.

(c) Rust-Proof Test

The rust-proof test was carried out by subjecting the test pieces to the 72 hour continuous salt spraying test specified in JIS (Japanese Industrial Standards) Z 2371, and measuring the area ratio of generated red rust in terms of percentage.

(1) Measurement of Sn—Zn Alloy Amount ($g/m^2$)

Each weight of Sn and Zn was determined by applying each value of Sn and Zn measured by a fluorescent X-ray spectrometer to the calibration curve of each weight of Sn and Zn prepared beforehand, and then the Sn—Zn alloy amount was obtained by summing each weight.

(2) Measurement of Zn/Sn Ratio (In Weight Ratio)

The Zn/Sn ratio was calculated from each weight of Sn and Zn obtained by the same method as shown in the item (1).

(3) Measurement of P+Mg Deposited Amount

The weight of P was determined by applying the value of P measured by a fluorescent X-ray spectrometer to the calibration curve of the weight of P prepared beforehand, the weight of Mg was determined by applying the value of Mg measured in a solution wherein a coating film is dissolved by acid using a high frequency inductively coupled plasma emission spectrometer to the calibration curve of the weight of Mg prepared beforehand, and then the P+Mg deposited amount was obtained by summing each weight of P and Mg.

Table 1 shows the details and the evaluation results of the performances of Examples and Comparative Examples in a summarized manner.

The evaluation results of the performances of Examples are shown in Examples 1—1 to 1-4 which an Sn—Zn alloy layer is formed by applying the thermal diffusion alloying treatment after electroplating of Sn and Zn, in Examples 2-1 and 2—2 which an Sn—Zn alloy layer is formed by applying hot dip plating and in Example 3 which an Sn—Zn alloy layer is formed by applying alloy electroplating.

The evaluation results of the performances of Comparative Examples are shown in Comparative Example 1—1 in the case of applying the thermal diffusion treatment after electroplating and then forming a chromate film, in Comparative Example 1-2 in the case of not applying chromate treatment and in Comparative Examples 2 and 3 in the cases of #100 tinplate and terneplate, respectively.

As seen in Examples, the case of employing the inorganic film containing P+Mg is better than the case of employing the chromate treatment in solder wettability after the accelerating treatment in a retort, shows a similar good performance in the rust-proof property, and shows more excellent performance than the #100 tinplate and the terneplate which are included in Comparative Examples.

TABLE 1

| | | Plating layer | | Surface film | | | | |
|---|---|---|---|---|---|---|---|---|
| | Plating method | Sn-Zn alloy amount ($g/m^3$) | Zn/Sn ratio (in weight ratio) | Treatment Condition | P + Mg deposited amount ($mg/m^2$) | (a) Solder wettability | (b) Whisker-Proof property | (c) Incidence of red rust (area percent) |
| Example 1-1 | Electroplating + thermal diffusion treatment | 10 | 0.1 | (5) | 10 | ⊙ | ○ | 2 |
| Example 1-2 | Electroplating + thermal diffusion treatment | 10 | 10 | (5) | 25 | ○ | ○ | 1 |
| Example 1-3 | Electroplating + thermal diffusion treatment | 15 | 0.01 | (5) | 14 | ⊙ | ○ | 1 |
| Example 1-4 | Electroplating + thermal diffusion treatment | 5 | 0.1 | (5) | 17 | ⊙ | ○ | 3 |
| Example 2-1 | Electroplating + hot dip plating | 35 | 1 | (5) | 20 | ○ | ○ | 1 |
| Example 2-2 | Electroplating + hot dip plating | 35 | 0.1 | (5) | 11 | ⊙ | ○ | 2 |
| Example 3 | Alloy electroplating | 10 | 0.1 | (5) | 14 | ⊙ | ○ | 1 |
| Comparative example 1-1 | Electroplating + thermal diffusion treatment | 10 | 0.05 | (8) | 2 $mg/m^2$ metallic chromium conversion | x | ○ | 3 |

TABLE 1-continued

|  | Plating method | Plating layer Sn-Zn alloy amount (g/m³) | Plating layer Zn/Sn ratio (in weight ratio) | Surface film Treatment Condition | Surface film P + Mg deposited amount (mg/m²) | (a) Solder wettability | (b) Whisker-Proof property | (c) Incidence of red rust (area percent) |
|---|---|---|---|---|---|---|---|---|
| Comparative example 1-2 | Electroplating + thermal diffusion treatment | 10 | 0.05 | None | — | Δ | ○ | 15 |
| Comparative example 2 | Electroplating + thermal diffusion treatment (#100 tinplate) | 12 | 0 | Dichromic acid, electro-lysis | 5 mg/m² in metallic chromium conversion | Δ | x | 20 |
| Comparative example 3 | Hot dip plating (terneplate) | 35 | — | — | None | Δ | ○ | 1 |

INDUSTRIAL APPLICABILITY

As explained above, a surface treated steel sheet according to the present invention has excellent performances in solder wettability after a retort treatment and a rust-proof property and a whisker-proof property which are suitable for electronic components. The present invention makes it possible to supply a surface treated steel sheet with less environmental impact for electronic components.

What is claimed is:

1. A surface treated steel sheet with less environmental impact for electronic components excellent in solder wettability, a rust-proof property and a whisker-proof property and having an Sn—Zn alloy layer which is formed by plating Sn and Zn on a steel sheet or a Ni plated steel sheet and then applying thermal diffusion treatment, or by plating Sn—Zn alloy on a steel sheet or a Ni plated steel sheet, characterized in that the amount of said Sn—Zn alloy layer is not less than 3 g/m², the Zn/Sn ratio (in weight ratio) is 0.01 to 10 and an inorganic film mainly composed of magnesium phosphate is formed in the amount of 1 to 100 mg/m² in terms of the amount of P+Mg on said Sn—Zn alloy layer.

2. A surface treated steel sheet with less environmental impact for electronic components excellent in solder wettability, a rust-proof property and a whisker-proof property according to claim 1, characterized in that the Zn/Sn ratio (in weight ratio) of an Sn—Zn alloy layer is 0.01 to 0.1.

* * * * *

(12) EX PARTE REEXAMINATION CERTIFICATE (6741st)
United States Patent
Yoshihara et al.

(10) Number: US 6,818,322 C1
(45) Certificate Issued: Mar. 31, 2009

(54) SURFACE TREATED STEEL SHEET WITH LESS ENVIRONMENTAL IMPACT FOR ELECTRONIC COMPONENTS, EXCELLENT IN SOLDER WETTABILITY, A RUST-PROOF PROPERTY AND A WHISKER-PROOF PROPERTY

(75) Inventors: Ryoichi Yoshihara, Himeji (JP);
Tokitsugu Shirakawa, Himeji (JP);
Yasuhiko Miura, Himeji (JP)

(73) Assignee: Nippon Steel Corporation, Chiyoda-Ku, Tokyo (JP)

Reexamination Request:
No. 90/009,181, Jun. 13, 2008

Reexamination Certificate for:
Patent No.: 6,818,322
Issued: Nov. 16, 2004
Appl. No.: 10/468,726
Filed: Aug. 21, 2003

(22) PCT Filed: Feb. 22, 2002

(86) PCT No.: PCT/JP02/01630
§ 371 (c)(1),
(2), (4) Date: Aug. 21, 2003

(87) PCT Pub. No.: WO02/066705
PCT Pub. Date: Aug. 29, 2002

(30) Foreign Application Priority Data
Feb. 22, 2001 (JP) .......................................... 200146152

(51) Int. Cl.
*B23K 35/00* (2006.01)
*C23C 30/00* (2006.01)
*C23C 28/02* (2006.01)
*C23C 2/02* (2006.01)
*C23C 26/00* (2006.01)
*C23C 28/00* (2006.01)
*C23C 2/26* (2006.01)
*C25D 5/48* (2006.01)
*C25D 5/50* (2006.01)
*C25D 5/10* (2006.01)

(52) U.S. Cl. ........................ 428/646; 428/648; 428/658; 428/679; 428/684

(58) Field of Classification Search ........................ None
See application file for complete search history.

(56) References Cited

U.S. PATENT DOCUMENTS

| 5,283,131 | A | 2/1994 | Mori et al. |
| 5,294,266 | A | 3/1994 | Hauffe et al. |
| 6,652,990 | B2 | 11/2003 | Carey, II et al. |

*Primary Examiner*—Alan Diamond (57) ABSTRACT

The present invention provides a surface treated steel sheet for electronic components which does not include lead, which is a hazardous substance with environmental impact, and, in particular, satisfies the solder wettability after retort treatment, a rust-proof property and a whisker-proof property simultaneously. More specifically, the present invention is a surface treated steel sheet with less environmental impact for electronic components excellent in solder wettability, a rust-proof property and a whisker-proof property and having an Sn—Zn alloy layer which is formed by plating Sn and Zn on a steel sheet or a Ni plated steel sheet and then applying thermal diffusion treatment, or by plating Sn—Zn alloy on a steel sheet or a Ni plated steel sheet, characterized in that the amount of said Sn—Zn alloy layer is not less than 3 g/m$^2$, the Zn/Sn ratio (in weight ratio) is 0.01 to 10, more preferably 0.01 to 0.1, and an inorganic film mainly composed of magnesium phosphate is formed in the amount of 1 to 100 mg/m$^2$ in terms of the amount of P+Mg on said Sn—Zn alloy layer.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

* * * * *